(12) United States Patent
Yim et al.

(10) Patent No.: US 12,462,600 B2
(45) Date of Patent: Nov. 4, 2025

(54) DISPLAY APPARATUS AND METHOD OF DRIVING THE SAME

(71) Applicant: Samsung Display Co., Ltd., Yongin-si (KR)

(72) Inventors: Dale Yim, Suwon-si (KR); Junhan Ko, Seoul (KR); Gunhee Chung, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 751 days.

(21) Appl. No.: 17/699,560

(22) Filed: Mar. 21, 2022

(65) Prior Publication Data
US 2023/0024171 A1    Jan. 26, 2023

(30) Foreign Application Priority Data
Jul. 22, 2021   (KR) .......................... 10-2021-0096411

(51) Int. Cl.
*G06V 40/16* (2022.01)
*G06V 10/12* (2022.01)
(Continued)

(52) U.S. Cl.
CPC ............ *G06V 40/162* (2022.01); *G06V 10/12* (2022.01); *G06V 10/50* (2022.01); *G06V 10/56* (2022.01)

(58) Field of Classification Search
CPC ...... G06V 40/162; G06V 10/12; G06V 10/50; G06V 10/56; G06V 10/751; G06V 40/171;

(Continued)

(56) References Cited

U.S. PATENT DOCUMENTS

| 11,418,757 | B1 * | 8/2022 | Parampottil ........... G11B 27/34 |
| 2005/0276469 | A1 * | 12/2005 | Kim ...................... G06V 40/162 |
| | | | 382/159 |

(Continued)

FOREIGN PATENT DOCUMENTS

| CN | 104299011 A | * | 1/2015 | ......... G06K 9/00234 |
| CN | 109472223 A | * | 3/2019 | ......... G06K 9/00234 |

(Continued)

OTHER PUBLICATIONS

English translation—CN-109472223-A (Year: 2019).*
English translation—CN-104299011-A (Year: 2015).*

*Primary Examiner* — Sumati Lefkowitz
*Assistant Examiner* — Aaron Joseph Sorrin
(74) *Attorney, Agent, or Firm* — CANTOR COLBURN LLP

(57) ABSTRACT

A display apparatus includes: a display panel including a plurality of pixels; a data driver which applies data voltages to the pixels; a gate driver which applies gate signals to the pixels; and a driving controller which controls the data driver and the gate driver. The driving controller divides the display panel into a plurality of panel blocks, calculates a skin color inclusion ratio of each of the panel blocks based on input image data, determines at least one face region candidate block among the panel blocks based on the skin color inclusion ratio, determines a face region block of the at least one face region candidate block based on the at least one face region candidate block and face matching data, and performs image quality processing on the face region block.

10 Claims, 18 Drawing Sheets

(51) Int. Cl.
*G06V 10/50* (2022.01)
*G06V 10/56* (2022.01)

(58) Field of Classification Search
CPC .... G06T 5/40; G09G 5/02; G09G 2320/0666; G09G 2320/0693
See application file for complete search history.

(56) References Cited

U.S. PATENT DOCUMENTS

2015/0169939 A1* 6/2015 Kim ................ G06V 40/162
   382/167
2020/0091253 A1* 3/2020 Liu ................ H01L 27/14612

FOREIGN PATENT DOCUMENTS

| KR | 1020210016984 A | 2/2021 |
| KR | 1020210042952 A | 4/2021 |

* cited by examiner

```
If((i_cr <= ((p_aa1*i_cb/2^8) + p_bb1)) &
   ((i_cr >  ((p_aa2*i_cb/2^8) + p_bb2)) &
   ((i_cr >  ((p_aa3*i_cb/2^8) + p_bb3)) &
   ((i_cr <= ((p_aa4*i_cb/2^8) + p_bb4))
   skin_detect_pixel=1;
else
   skin_detect_pixel=0;
```

FIG. 17

```
color_en_sumarea = ∑       ∑      skin_detect_pixel
                 horizontal vertical color_en_sum4by8=
[color_en_sumarea1,color_en_sumarea2,color_en_sumarea3,color_en_sumarea4,color_en_sumarea5,
color_en_sumarea6,color_en_sumarea7,color_en_sumarea8,color_en_sumarea9,color_en_sumarea10,
color_en_sumarea11,color_en_sumarea12,color_en_sumarea13,color_en_sumarea14,color_en_sumarea15,
color_en_sumarea16,color_en_sumarea17,color_en_sumarea18,color_en_sumarea19,color_en_sumarea20,
color_en_sumarea21,color_en_sumarea22,color_en_sumarea23,color_en_sumarea24,color_en_sumarea25,
color_en_sumarea26,color_en_sumarea27,color_en_sumarea28,color_en_sumarea29,color_en_sumarea30,
color_en_sumarea31,color_en_sumarea32];

for y = 1:8
  for x = 1:4
    if(color_en_sum4by8(x,y) >= colorsum_threst_scale)
        face_candidate = 1
    else
        face_candidate = 0
```

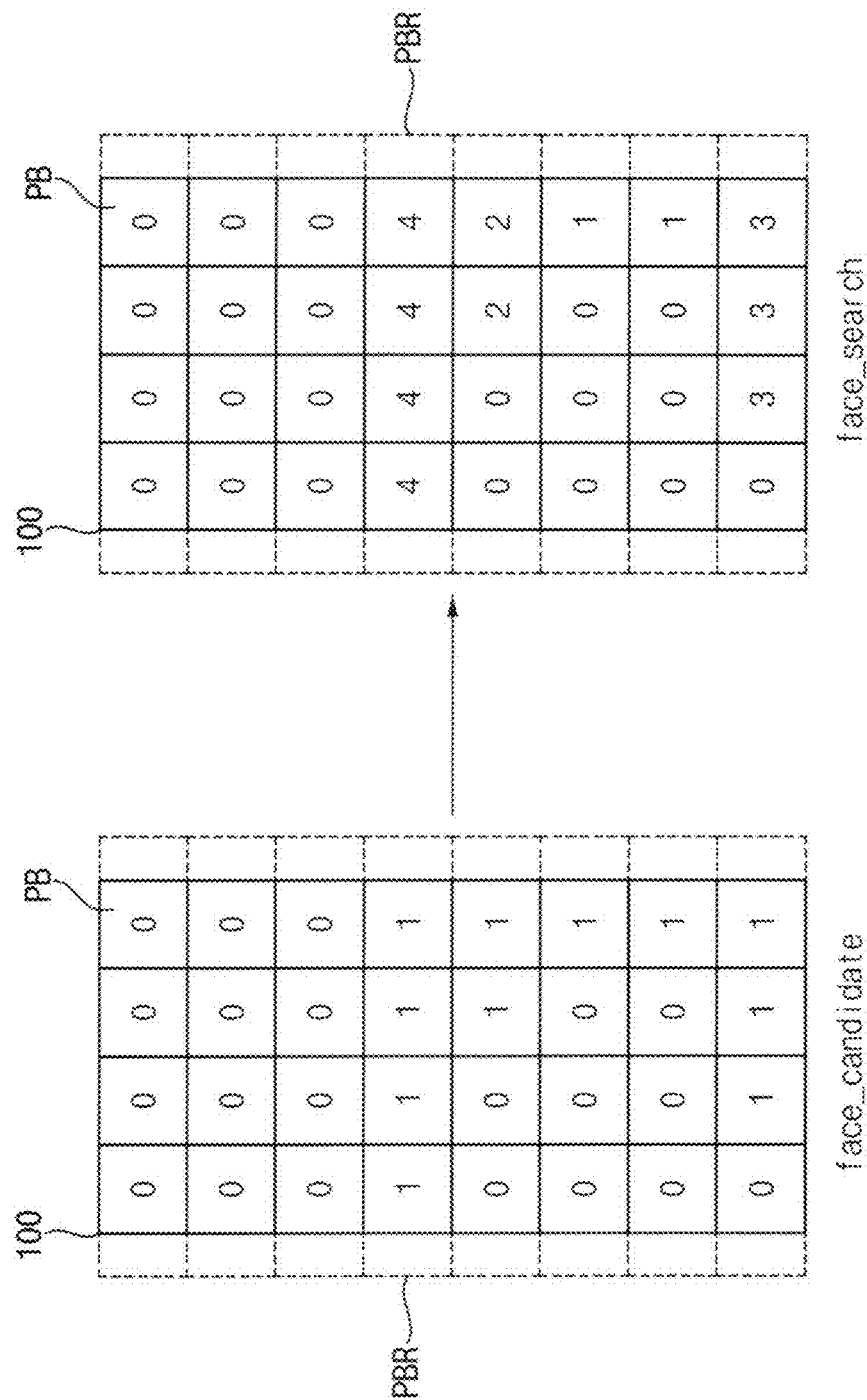

FIG. 19A width_local 100 PB

| | | | | |
|---|---|---|---|---|
| 0 | 0 | 0 | 0 | } height_local |
| 0 | 0 | 0 | 0 | |
| 0 | 0 | 0 | 0 | |
| 4 | 4 | 4 | 4 | |
| 0 | 0 | 2 | 2 | |
| 0 | 0 | 0 | 1 | |
| 0 | 0 | 0 | 1 | |
| 0 | 3 | 3 | 3 | |

A2 — A3
A1 — A4 face_search

FIG. 19B

```
A1_hs = width_local*0;
A1_he = (width_local*0 + 256);
A2_hs = width_local*1 + 1;
A2_he = (width_local*1+256 + 1);
A3_hs = width_local*2 + 1;
A3_he = (width_local*2+256 + 1);
A4_hs = width_local*3 + 1;
A4_he = (width_local31+256 + 1);

for y=1:1:8
  for x=1:1:4
    if(face_search(y,x)==4 && y=1)
      A1_Vs = height_local*0 ;
      A1_Ve = (height_local*0 + 256);
      search_y1(y,1)=1;
    elseif(face_search(y,x) == 4 && y==2)
      A1_Vs = height_local*1 ;
      A1_Ve = (height_local*1 + 256);
      search_y1(y,1)=1;
    elseif(face_rsearch(y,x) == 4 && y==3)
      A1_Vs = height_local*2 ;
      A1_Ve = (height_local*2 + 256);
      search_y1(y,1)=1;
    elseif(face_rsearch(y,x) == 4 && y==4)
      A1_Vs = height_local*3 ;
      A1_Ve = (height_local*3 + 256);
      search_y1(y,1)=1;
    elseif(face_search(y,x) == 4 && y==5)
      A1_Vs = height_local*4 ;
      A1_Ve = (height_local*4 + 256);
      search_y1(y,1)=1;
    elseif(face_search(y,x) == 4 && y==6)
      A1_Vs = height_local*5 ;
      A1_Ve = (height_local*5 + 256);
      search_y1(y,1)=1;
    elseif(face_search(y,x) == 4 && y==7)
      A1_Vs = height_local*6 ;
      A1_Ve = (height_local*6 + 256);
      search_y1(y,1)=1;
    elseif(face_search(y,x) == 4 && y==8)
      A1_Vs = height_local*7 ;
      A1_Ve = (height_local*7 + 256);
      search_y1(y,1)=1;
  end A2_Vs = A1_Vs;
A2_Ve = A1_Ve;
A3_Vs = A1_Vs;
A3_Ve = A1_Ve;
A4_Vs = A1_Vs;
A4_Ve = A1_Ve;

Search_x1=
[1 1 1 1]

Search_y1=
[0
 0
 0
 1
 0
 0
 0
 0]
```

FIG. 20

```
p_tcb = p_tcb * 2^7;
p_tcr = p_tcr * 2^7;
n_numer1[23:0] = round(p_aa1*(i_cb - p_tcb)/2^8) - (i_cr - p_tcr);
n_value1[11:0] = round(n_numer1*p_aadenom1/2^11);
n_numer2[23:0] = round(p_aa2*(i_cb - p_tcb)/2^8) - (i_cr - p_tcr);
n_value2[11:0] = round(n_numer2*p_aadenom2/2^11);
n_numer3[23:0] = round(p_aa3*(i_cb - p_tcb)/2^8) - (i_cr - p_tcr);
n_value3[11:0] = round(n_numer3*p_aadenom3/2^11);
n_numer4[23:0] = round(p_aa4*(i_cb - p_tcb)/2^8) - (i_cr - p_tcr);
n_value4[11:0] = round(n_numer4*p_aadenom4/2^11);
max_n[11:0] = max((n_value1,n_value2,n_value3,n_value4)) ;

igain = p_gaincc*2^4;
weight = max_n*igain/2^12) + (2^12 - igain);
o_cb = p_tcb + round(weight*(i_cb-p_tcb)/2^12);
o_cr = p_tcr + round(weight*(i_cr-p_tcr)/2^12);
```

DISPLAY APPARATUS AND METHOD OF DRIVING THE SAME

This application claims priority to Korean Patent Application No. 10-2021-0096411, filed on Jul. 22, 2021, and all the benefits accruing therefrom under 35 U.S.C. § 119, the content of which in its entirety is herein incorporated by reference.

BACKGROUND

1. Field

Embodiments of the present invention relate to a display apparatus. More particularly, embodiments of the present invention relate to a display apparatus for recognizing a face.

2. Description of the Related Art

Generally, a display apparatus may include a display panel and a display panel driver. The display panel includes gate lines, data lines, and pixels electrically connected to the gate lines and the data lines. The display panel driver may include a gate driver providing gate signals to the pixels through the gate lines, a data driver providing data voltages to the pixels through the data lines, and a driving controller controlling the gate driver and the data driver.

An internal algorithm or structure of a face recognition technique using an artificial intelligence ("AI") algorithm, such as a convolutional neural network ("CNN") algorithm, cannot be known. In addition, the face recognition technique using the AI algorithm may lead to biased results according to an intention of a training subject or a trainer.

SUMMARY

Embodiments of the present invention provide a display apparatus independently performing face recognition on the display apparatus Embodiments of the present invention also provide a method of driving the display apparatus.

In embodiments of a display apparatus according to the present invention, the display apparatus includes: a display panel including a plurality of pixels; a data driver which applies data voltages to the pixels; a gate driver which applies gate signals to the pixels; and a driving controller which controls the data driver and the gate driver. The driving controller is configured to divide the display panel into a plurality of panel blocks, to calculate a skin color inclusion ratio of each of the panel blocks based on input image data, to determine at least one face region candidate block among the panel blocks based on the skin color inclusion ratio, to determine a face region block of the at least one face region candidate block based on the at least one face region candidate block and face matching data, and to perform image quality processing on the face region block.

In an embodiment, the driving controller may be configured to determine skin color display pixels included in each of the panel blocks by determining whether pixels included in each of the panel blocks display a skin color, and to calculate the skin color inclusion ratio of each of the panel blocks based on the number of the skin color display pixels included in each of the panel blocks.

In an embodiment, the driving controller may be configured to determine each of the skin color display pixels by using equations "i_cr<=((p_aa1*i_cb/k)+p_bb1)", "i_cr>((p_aa2*i_cb/k)+p_bb2)", "i_cr>((p_aa3*i_cb/k)+p_bb3)", and "i_cr<=((p_aa4*i_cb/k)+p_bb4)", where i_cr represents Cr color difference data of each of the plurality of pixels before the image quality processing is performed, i_cb represents Cb color difference data of each of the pixels before the image quality processing is performed, p_aa1 represents a first slope setting value, p_aa2 represents a second slope setting value, p_aa3 represents a third slope setting value, p_aa4 represents a fourth slope setting value, p_bb1 represents a first corner setting value, p_bb2 represents a second corner setting value, p_bb3 represents a third corner setting value, p_bb4 represents a fourth corner setting value, and k represents a first bit adjusting value.

In an embodiment, the driving controller may be configured to determine a panel block of the panel blocks with the skin color inclusion ratio greater than or equal to a threshold inclusion ratio as one of the at least one face region candidate block.

In an embodiment, the face matching data may be generated based on different face images, and the different face images are generated based on different angles of a face or different illumination on the face.

In an embodiment, the driving controller may be configured to determine the face region block based on a difference value between a pixel value of the face matching data and a pixel value of the input image data for the at least one face region candidate block.

In an embodiment, the driving controller may be configured to count the number of pixels for which the difference value is smaller than a reference value in the face region candidate block, and to determine the face region block based on the counted number of the pixels in each of the at least one face region candidate block.

In an embodiment, the driving controller may be configured to generate a histogram based on the difference value in each of the at least one face region candidate block, and to determine the face region block based on the histogram.

In an embodiment, the driving controller may be configured to determine a face region candidate block of the at least one face region candidate block included in one panel block row in each frame as the face region block based on the face matching data.

In an embodiment, when the number of face region candidate blocks of the at least one face region candidate block included in a first panel block row of the display panel is less than the number of face region candidate blocks of the at least one face region candidate block included in a second panel block row of the display panel, the driving controller may be configured to determine the face region block in the first panel block row after determining the face region block in the second panel block row.

In an embodiment, when a sum of the number of face region candidate blocks of the at least one face region candidate block included in a first panel block row and the number of face region candidate blocks of the at least one face region candidate block included in a second panel block row of the display panel is less than or equal to the number of panel blocks in each panel block row of the display panel, the driving controller may be configured to determine the face region block in the first and second panel block rows in one frame at once.

In an embodiment, the driving controller may be configured to adjust saturation of the face region block to perform the image quality processing.

In an embodiment, the driving controller may be configured to perform the image quality processing by using equations "o_cb=p_tcb+weight*(i_cb-p_tcb)/z" and "o_cr=p_tcr+weight*(i_cr-p_tcr)/z", where o_cb represents Cb color difference data of each of the plurality of pixels after the image quality processing is performed, o_cr represents the Cr color difference data of each of the plurality of pixels after the image quality processing is performed, p_tcb represents target Cb color difference data, p_tcr represents target Cr color difference data, weight represents a weight, i_cb represents Cb color difference data of each of the plurality of pixels before the image quality processing is performed, i_cr represents Cr color difference data of each of the plurality of pixels before the image quality processing is performed, and z represents a second bit adjusting value.

In embodiments of a method of driving a display apparatus according to the present invention, the method includes: calculating a skin color inclusion ratio of each of panel blocks in a K-th frame (where K is a positive integer); determining a panel block of the panel blocks with the skin color inclusion ratio greater than or equal to a threshold inclusion ratio as a face region candidate block; determining a face region block based on the face region candidate blocks after a K-th frame; and performing image quality processing on the face region block.

In an embodiment, the method may further include storing face matching data.

In an embodiment, the calculating of the skin color inclusion ratio may include: determining skin color display pixels included in each of the panel blocks by determining whether pixels included in each of the panel blocks display a skin color; and calculating the skin color inclusion ratio of each of the panel blocks based on the number of the skin color display pixels included in each of the panel blocks.

In an embodiment, the face region block may be determined based on a difference value between a pixel value of face matching data and a pixel value of input image data for the face region candidate block.

In an embodiment, the determining of the face region block may include: counting the number of pixels for which the difference value is smaller than a reference value in the face region candidate block; and determining the face region block based on the counted number of the pixels in the face region candidate block.

In an embodiment, the face region candidate block may be provided in plural, and when the number of the face region candidate blocks included in a first panel block row of a display panel is less than the number of the face region candidate blocks included in a second panel block row of the display panel, the face region block in the first panel block row may be determined after determining the face region block in the second panel block row.

In an embodiment, the face region candidate block may be provided in plural, and when a sum of the number of the face region candidate blocks included in a first panel block row and the number of the face region candidate blocks included in a second panel block row of a display panel is less than or equal to the number of panel blocks in each panel block row of the display panel, the face region block in the first and second panel block rows may be determined in one frame at once.

Therefore, the display apparatus according to embodiments may independently perform face recognition by performing the face recognition based on the face matching data and the input image data.

Also, the display apparatus according to embodiments may perform the face recognition regardless of a direction of face in image by using the face matching data including rotation-specific information.

However, the effects of the present invention are not limited to the above-described effects, and may be variously expanded without departing from the spirit and scope of the present invention.

BRIEF DESCRIPTION OF THE DRAWINGS

The above and other features and advantages of the present invention will become more apparent by describing in detailed embodiments thereof with reference to the accompanying drawings, in which:

FIG. 16 is a diagram illustrating an example of equations used when a display apparatus according to an embodiment determines a skin color display pixel;

FIG. 17 is a diagram illustrating an example of equations used when the display apparatus of FIG. 16 determines a face region candidate block;

FIG. 18 is a diagram illustrating an example in which the display apparatus of FIG. 16 generates search data;

FIGS. 19A and 19B are a diagram illustrating an example in which the display apparatus of FIG. 16 generates matching coordinates;

FIG. 20 is a diagram illustrating an example of equations used when the display apparatus of FIG. 16 performs image quality processing.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or"includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
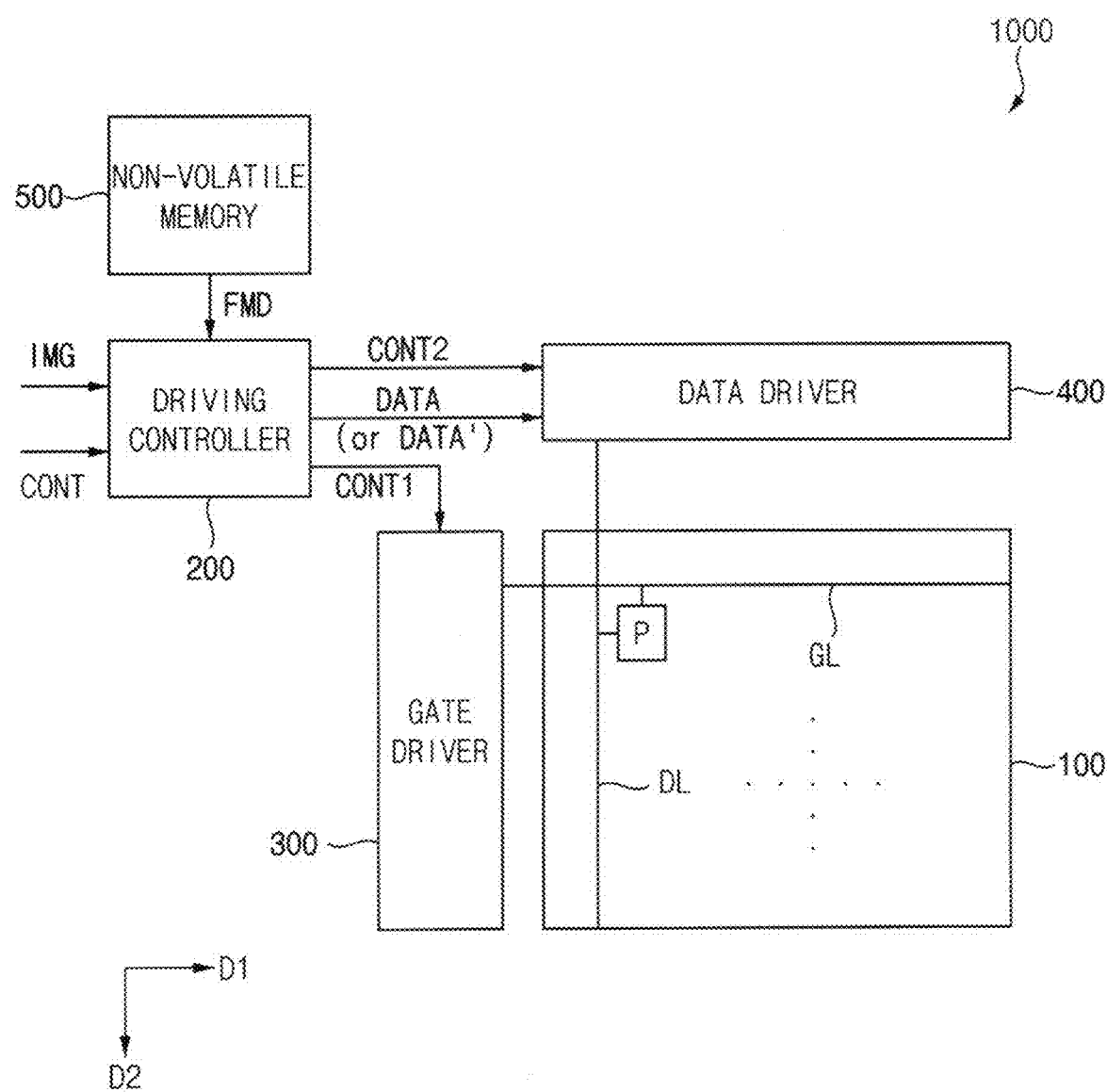
FIG. 1 is a block diagram illustrating a display apparatus according to embodiments of the present invention.

FIG. 1 is a block diagram illustrating a display apparatus 1000 according to embodiments of the present invention.

Referring to FIG. 1, the display apparatus 1000 may include a display panel 100, a driving controller 200, a gate driver 300, and a data driver 400. According to an embodiment, the display apparatus 1000 may further include a non-volatile memory 500. According to an embodiment, at least two or more of the driving controller 200, the gate driver 300, and the data driver 400 may be integrated into one chip. According to an embodiment, the gate driver 300 may be disposed in the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The driving controller 200 may receive input image data IMG and an input control signal CONT from an external apparatus (e.g., a graphic processing unit; GPU). For example, the input image data IMG may include red image data, green image data and blue image data. According to an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal. According to an embodiment, the driving controller 200 may receive face matching data FMD from the non-volatile memory 500.

The driving controller 200 may generate a first control signal CONT1, a second control signal CONT2, and a data signal DATA (or, a data signal DATA' performed image quality processing) based on the input image data IMG, the input control signal CONT, and the face matching data FMD.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may receive the input image data IMG and generate the data signal DATA (or, the data signal DATA' performed the image quality processing). The driving controller 200 may output the data signal DATA (or, the data signal DATA' performed image quality processing) to the data driver 400.

The gate driver 300 may generate gate signals in response to the first control signal CONT1 input from the driving controller 200. The gate driver 300 may output the gate signals to the gate lines GL. For example, the gate driver 300 may sequentially output the gate signals to the gate lines GL.

The data driver 400 may receive the second control signal CONT2 and the data signal DATA (or, the data signal DATA' performed the image quality processing) from the driving controller 200. The data driver 400 may convert the data signal DATA (or, the data signal DATA' performed the image quality processing) into a data voltage having an analog type. The data driver 400 may output the data voltage to the data lines DL In an embodiment, the non-volatile memory 500 may store the face matching data FMD. According to an embodiment, the face matching data FMD may be updated.

Figures 2, 3:
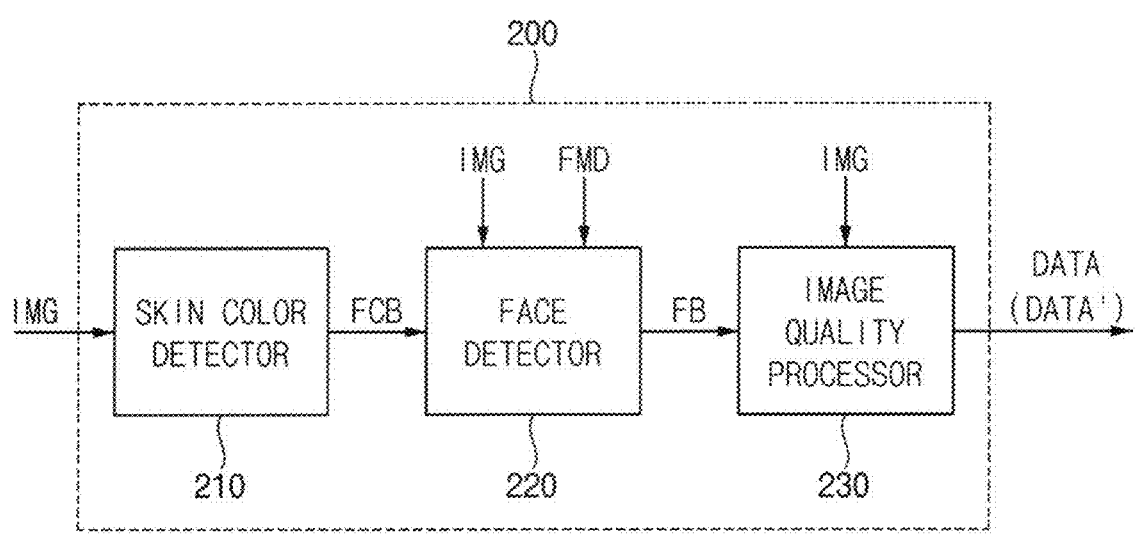
FIG. 2 is a diagram illustrating an example of a display panel of the display apparatus of FIG. 1.
FIG. 3 is a block diagram illustrating an example of a driving controller of the display apparatus of FIG. 1.

FIG. 2 is a diagram illustrating an example of the display panel 100 of the display apparatus 1000 of FIG. 1, and FIG. 3 is a block diagram illustrating an example of the driving controller 200 of the display apparatus 1000 of FIG. 1.

Referring to FIG. 2, the driving controller 200 may divide the display panel 100 into a plurality of panel blocks PB. Each panel block PB may include a plurality of pixels P. For example, the driving controller 200 may divide the display panel 100 into 4×8 regions. That is, the display panel 100 may be divided into four panel blocks in a row direction, and eight panel blocks in a column direction. Accordingly, the driving controller 200 may divide the display panel 100 into a plurality of panel blocks PB (1, 2, . . . , 31, 32).

Referring to FIG. 3, the driving controller 200 may calculate a skin color inclusion ratio of each of the panel blocks PB based on the input image data IMG. The driving controller 200 may determine at least one face region candidate block FCB among the panel blocks PB based on the skin color inclusion ratio. The driving controller 200 may determine a face region block FB of the at least one face region candidate block FCB based on the at least one face region candidate block FCB and the face matching data FMD. The driving controller 200 may perform the image quality processing on the face region block FB.

The driving controller 200 may include the skin color detector 210, face detector 220, and image quality processor 230.

The skin color detector 210 may receive the input image data IMG and calculate the skin color inclusion ratio of each of the panel blocks PB based on the input image data IMG. The skin color detector 210 may determine the at least one face region candidate block FCB among the panel blocks PB based on the skin color inclusion ratio. First, the skin color detector 210 may find the panel blocks PB which display a skin color in order to find the panel blocks PB which display a face image. A detailed description will be given later.

The face detector 220 may determine the face region block FB based on the at least one face region candidate block FCB and the face matching data FMD. For example, the face detector 220 may overlap the face matching data FMD to the input image data IMG for the face region candidate block FCB, so that the face detector 220 may determine the face region block FB based on a difference value between a pixel value of the face matching data FMD and a pixel value of the input image data IMG for the face region candidate block FCB. Accordingly, the face detector 220 may find the panel blocks PB which display the face image among the panel blocks PB which display the skin color. A detailed description will be given later.

The image quality processor 230 may perform the image quality processing on the face region block FB. The image quality processor 230 may perform the image quality processing on a part of the input image data IMG for the face region block FB. For example, the image quality processor 230 may adjust a saturation (or chroma) of the face region block FB to be high or low. A detailed description will be given later.

Figure 4:
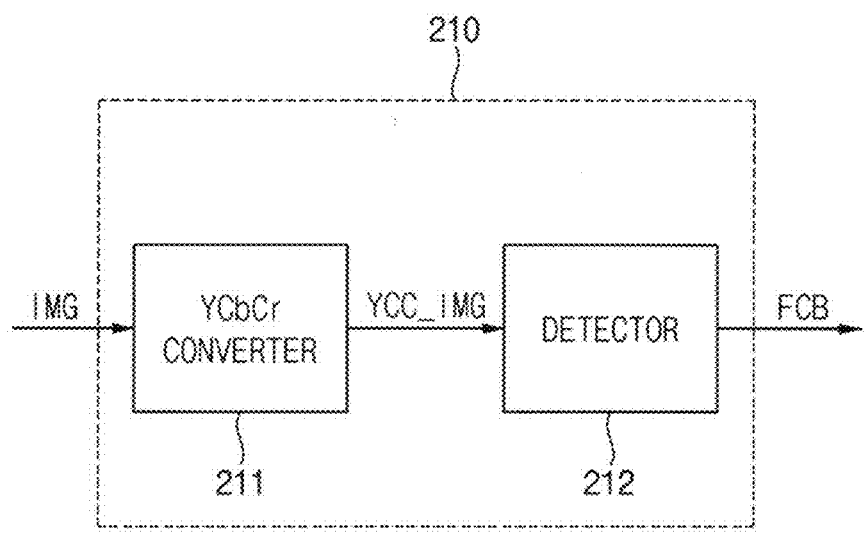
FIG. 4 is a block diagram illustrating an example of skin color detector of FIG. 3.
Figure 5:
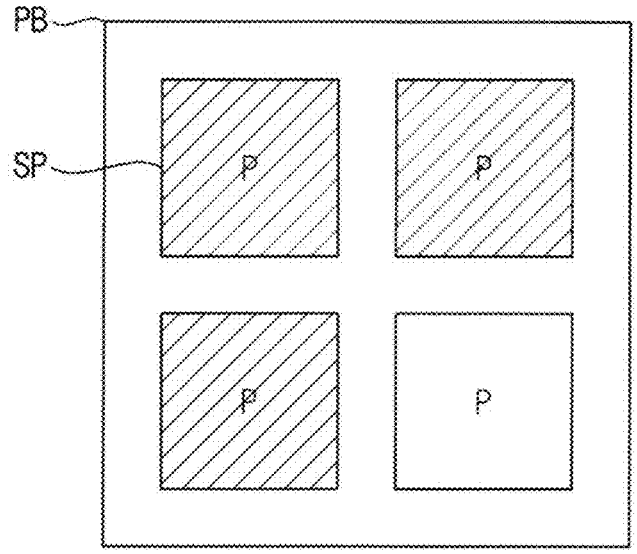
FIGS. 5 and 6 are diagrams illustrating an example of a panel block of the display panel of FIG. 2.
Figure 6:
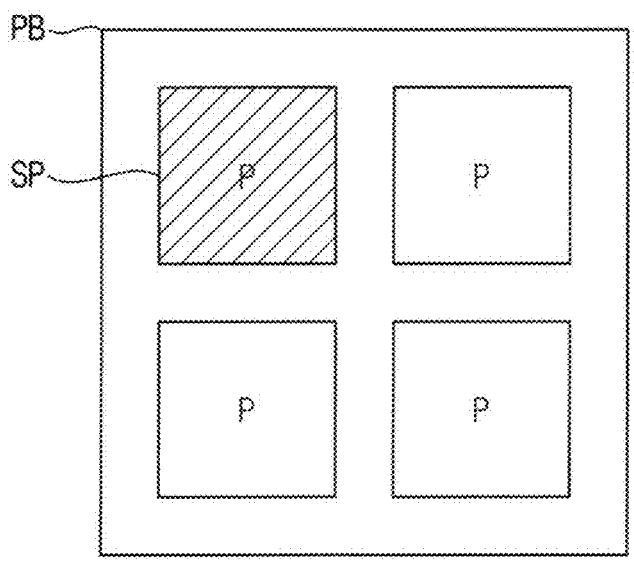

FIG. 4 is a block diagram illustrating an example of skin color detector 210 of FIG. 3, and FIGS. 5 and 6 are diagrams illustrating an example of the panel blocks PB of the display panel of FIG. 2.

Referring to FIG. 4, the skin color detector 210 may include a YCbCr converter 211 and a detector 212. The YCbCr converter 211 may convert RGB data of the input image data IMG into YCbCr data YCC_IMG. The detector 212 may determine the face region candidate block FCB based on the YCbCr data YCC_IMG.

For example, the YCbCr converter 211 may convert RGB data included in the 10-bit input image data IMG into the 15-bit YCbCr data YCC_IMG. For example, the YCbCr data YCC_IMG may include luminance data, Cb chrominance data, and Cr chrominance data. For example, the YCbCr data YCC_IMG may include the 15-bit luminance data, the 15 bit of Cb chrominance data, and the 15-bit of Cr chrominance data.

Referring to FIGS. 1, 5, and 6, the driving controller 200 may determine skin color display pixels SP included in each of the panel blocks PB by determining whether the pixels P included in each of the panel blocks PB display a skin color, and calculate the skin color inclusion ratio of each of the panel blocks PB based on the number of the skin color display pixels SP included in each of the panel blocks PB. The driving controller 200 may determine a panel block PB of which the skin color inclusion ratio is greater than or equal to a threshold inclusion ratio CR as the face region candidate block FCB.

For example, referring to FIG. 5, it is assumed that one panel block PB includes four pixels P, three pixels P display the skin color, and the threshold inclusion ratio CR is 0.7. Since the three pixels P among the four pixels P display the skin color, the skin color inclusion ratio may be 0.75. Accordingly, since the skin color inclusion ratio 0.75 is greater than the threshold inclusion ratio CR of 0.7, the panel block PB of FIG. 5 may become the face region candidate block FCB.

For example, referring to FIG. 6, it is assumed that one panel block PB includes four pixels P, only one pixel P displays the skin color, and the threshold inclusion ratio CR is 0.7. Since only one pixel P among the four pixels P displays the skin color, the skin color inclusion ratio is 0.25. Therefore, since the skin color inclusion ratio 0.25 is less than the threshold inclusion ratio CR of 0.7, the panel block PB of FIG. 5 may not be the face region candidate block FCB.

Figure 7:
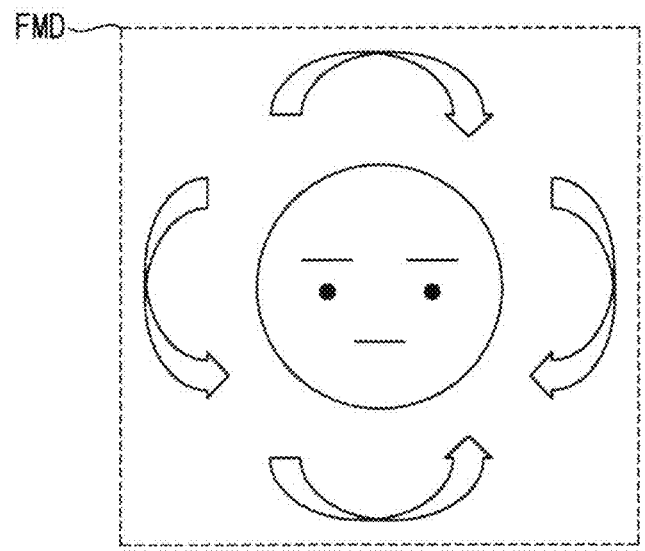
FIG. 7 is a diagram illustrating an example of face matching data of the display apparatus of FIG. 1.
Figure 8:
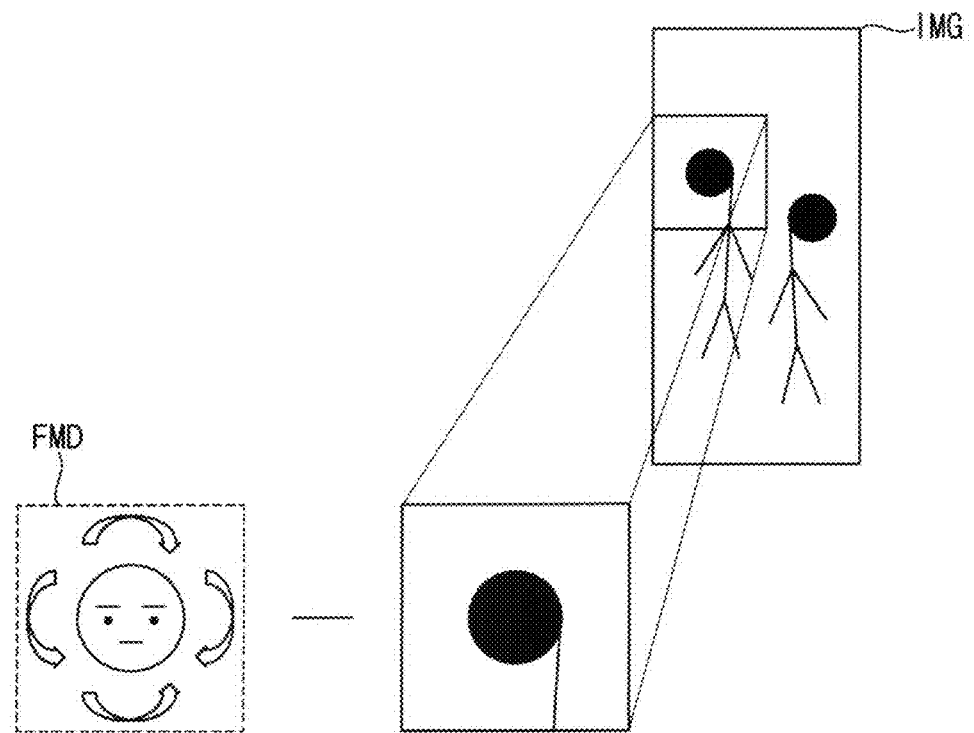
FIG. 8 is a diagram illustrating an example in which the display apparatus of FIG. 1 determines a face region block.
Figure 9:
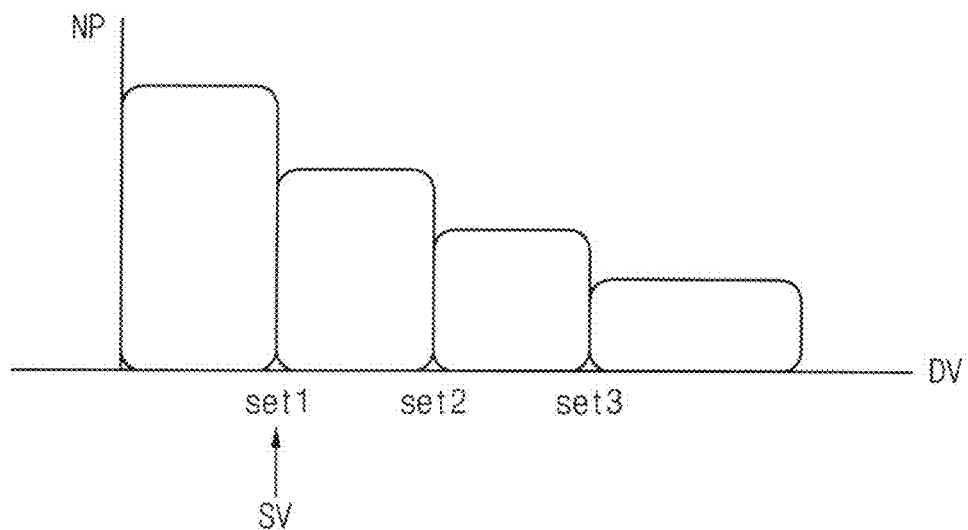
FIG. 9 is a diagram illustrating an example of a histogram generated by a driving controller of the display apparatus of FIG. 1.

FIG. 7 is a diagram illustrating an example of face matching data FMD of the display apparatus 1000 of FIG. 1, FIG. 8 is a diagram illustrating an example in which the display apparatus 1000 of FIG. 1 determines the face region block FB, and FIG. 9 is a diagram illustrating an example of a histogram generated by the driving controller 200 of the display apparatus 1000 of FIG. 1.

Referring to FIG. 7, the face matching data FMD may be generated based on different face images, and the different face images are generated based on different angles of a face or different illumination on the face. For example, the face matching data FMD may include data on the face image viewed from all angles. For example, the face matching data FMD may be an average face image of the different face images according to the angle of the face and the illumination on the face. For example, the face matching data FMD may be an average face image of the different face images according to conditions that change the face image. As a result, the driving controller 200 may find the panel block PB which displays the face image regardless of the angle of the face and the illumination on the face (that is, regardless of which direction of the face is displayed by the panel block PB). Also, the driving controller 200 may find the panel block PB which displays the face image regardless of the conditions of the face displayed on the image.

Referring to FIGS. 8 and 9, the driving controller 200 may determine the face region block FB based on the difference value DV between the pixel value of the face matching data FMD and the pixel value of the input image data IMG for the face region candidate block FCB. For example, the driving controller 200 may determine the face region block FB based the difference value DV between the pixel value of the face matching data FMD in RGB domain and the pixel value of the input image data IMG for the face region candidate block FCB in the RGB domain. The driving controller 200 may count the number NP of the pixels P for which the difference value DV is smaller than a reference value SV in the face region candidate block FCB, and determine the face region block FB based on the counted number NP of the pixels P in the face region candidate block FCB.

Referring to FIG. 9, the driving controller 200 may set a plurality of set values (set1, set2, and set3) for generating the histogram. The driving controller 200 may generate the histogram based on the difference value DV in the face region candidate block FCB and determine the face region block FB based on the histogram. The driving controller 200 may count the number of the pixels P for which the difference value DV is smaller than the reference value SV based on the histogram, and determine the face region candidate block FCB as the face region block FB when the number NP is greater than or equal to a preset value. FIG. 8 illustrates a case in which the set values are three, but is not limited thereto.

Figure 10:
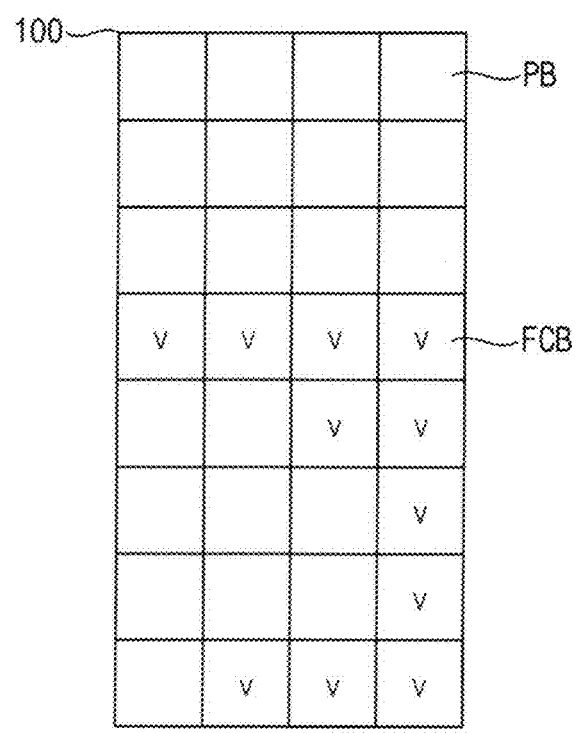
FIGS. 10 to 12 are diagrams illustrating a display panel of the display apparatus of FIG. 1.
Figure 11:
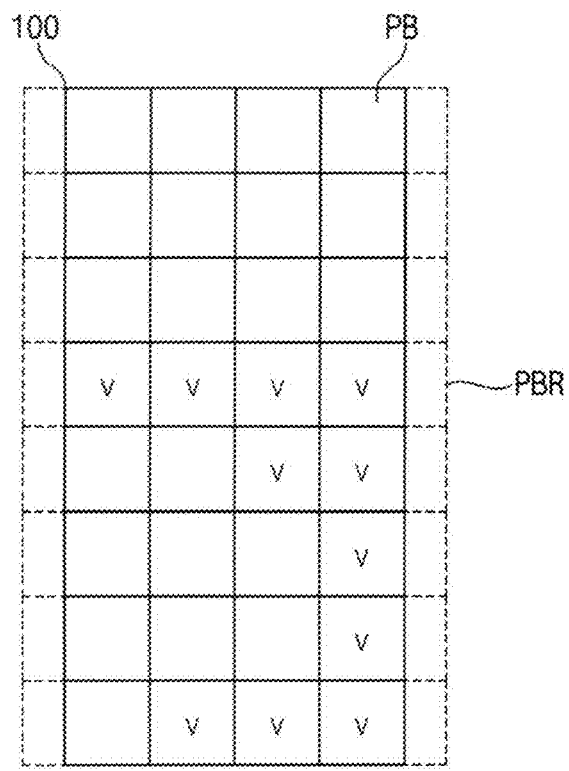
Figure 12:
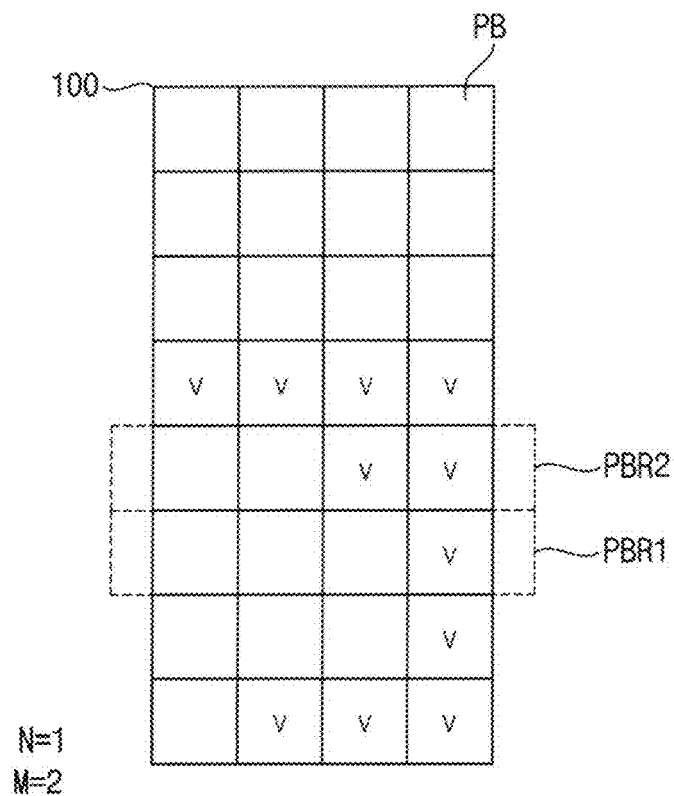
Figure 13:
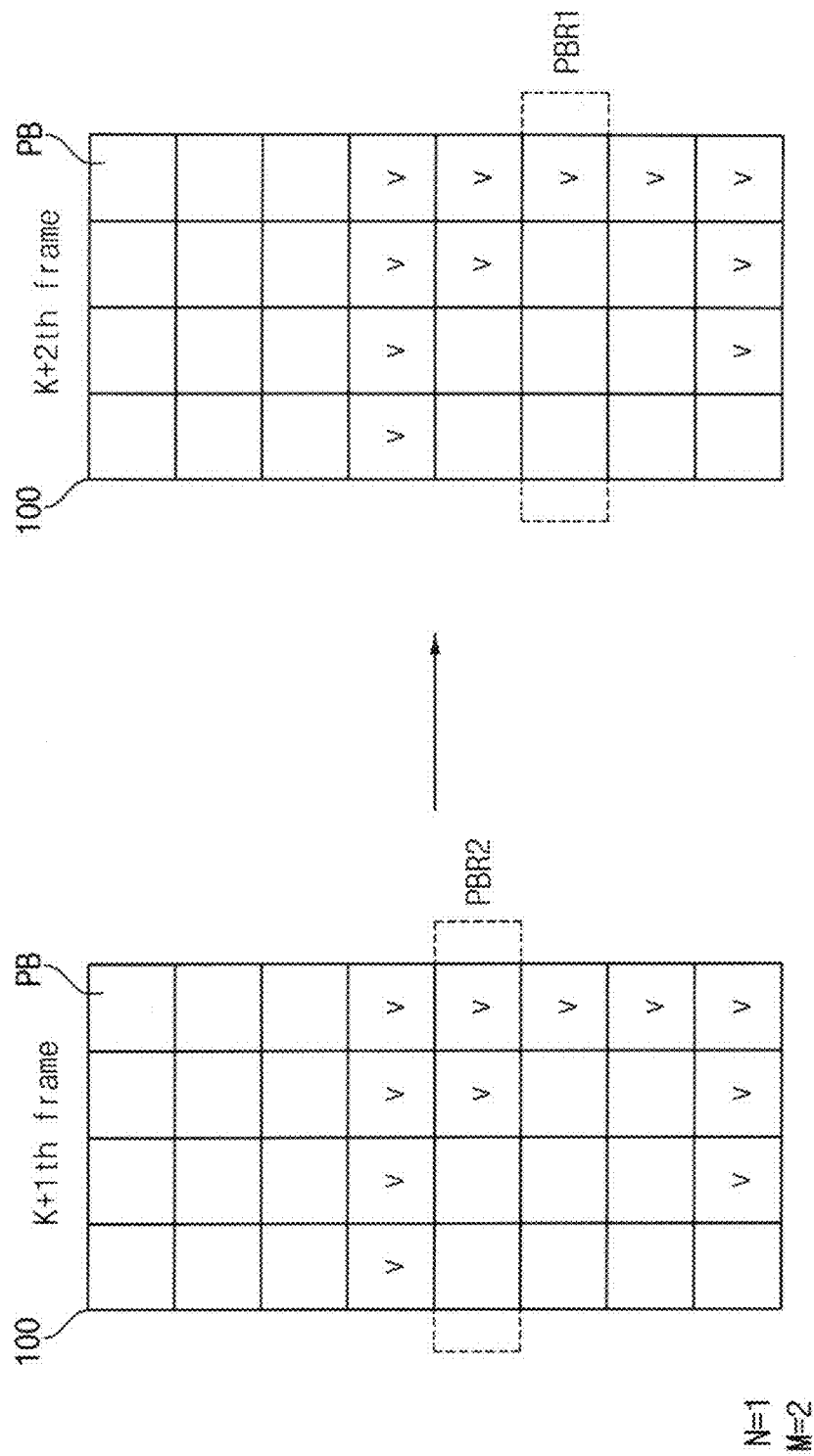
FIG. 13 is a diagram illustrating an order in which a driving controller of the display apparatus of FIG. 1 determines a face region block.

FIGS. 10 to 12 are diagrams illustrating the display panel 100 of the display apparatus 1000 of FIG. 1, FIG. 13 is a diagram illustrating an order in which the driving controller 200 of the display apparatus 1000 of FIG. 1 determines the face region block FB. FIGS. 10 to 13 have the same panel block numbers as the display panel 100 of FIG. 2. It is assumed that the panel blocks PB of which numbers are 13, 14, 15, 16, 19, 20, 24, 28, 30, 31, and 32, respectively, are the face region candidate blocks FCB.

Referring to FIGS. 8 and 10 to 13, the driving controller 200 may determine the face region candidate block FCB included in one panel block row PBR in each frame as the face region block FB based on the face matching data FMD. The panel block row PBR may mean a set of panel blocks PB included in one row. For example, the driving controller 200 may determine whether the face region candidate block FCB included in one panel block row PBR is the face region block FB per frame. In another embodiment, for example, the driving controller 200 may determine whether the face region candidate block FCB included in the plurality of panel block rows PBR is the face region block FB per frame. According to still another embodiment, the driving controller 200 may determine the face region candidate block FCB included in one panel block column in each frame as the face region block FB based on the face matching data FMD. The panel block column may mean a set of panel blocks PB included in one column in a direction orthogonal to the panel block row PBR.

According to an embodiment, when the number of the face region candidate blocks FCB included in a first panel block row PBR1 of the display panel 100 is less than the number of the face region candidate blocks FCB included in a second panel block row PBR2 of the display panel 100, the driving controller 200 may determine the face region block FB in the first panel block row PBR1 after determining the face region block FB in the second panel block row PBR2.

For example, the display panel 100 may include the first panel block row PBR1 including N face region candidate blocks FCB (where N is a positive integer) and the second panel block row PBR2 including M face region candidate blocks FCB (where M is a positive integer greater than N). The driving controller 200 may determine the face region block FB in the first panel block row PBR1 after determining the face region block FB in the second panel block row PBR2.

FIGS. 12 and 13, for example, it is assume that the first panel block row PBR1 is a set of panel blocks PB of which numbers are 17, 18, 19, and 20, respectively, and the second panel block row PBR2 is a set of panel blocks PB of which numbers are 21, 22, 23, and 24, respectively. For example, the driving controller 200 may determine the face region block FB in the second panel block row PBR2 including more face region candidate blocks FCB than the first panel block row PBR1 in a K+1th frame (where K is a positive integer). And, the driving controller 200 may determine the face region block FB in the first panel block row PBR2 in a K+2th frame (where K is a positive integer). That is, the driving controller 200 may first determine the face region block FB from the panel block row PBR including more face region candidate blocks FCB. For example, the driving controller 200 may first determine the face region block FB in the panel block row PBR including the panel blocks PB of which numbers are 13, 14, 15, and 16, respectively. According to an embodiment, the driving controller 200 may determine that the panel block row PBR not including the face region candidate block FCB does not include the face region block FB without separate calculation.

Figure 14:
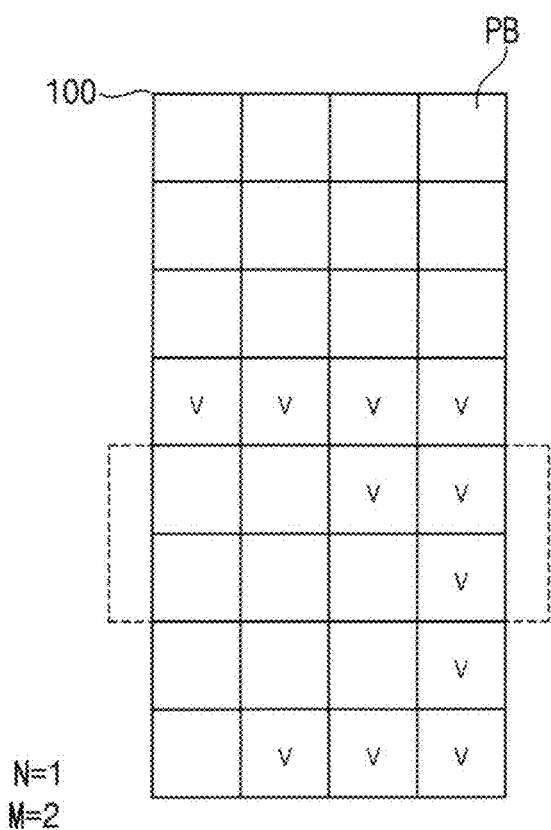
FIG. 14 is a diagram illustrating that a display apparatus determines a face region block according to another embodiment of the present invention.

FIG. 14 is a diagram illustrating that a display apparatus determines the face region block FB according to another embodiment of the present invention.

The display apparatus according to the present embodiment is substantially the same as the display apparatus 1000 of FIG. 1 except for an order in which the driving controller 200 determines the face region block FB. Thus, the same reference numerals are used to refer to the same or similar element, and any repetitive explanation will be omitted.

Referring to FIG. 14, when a sum of the number of the face region candidate blocks FCB included in the first panel block row PBR1 and the number of the face region candidate blocks FCB included in the second panel block row PBR2 of the display panel 100 is less than or equal to the number of the panel blocks PB in one panel block row PBR of the display panel 100, the driving controller 200 may determine the face region block FB in the first and second panel block rows PBR1 and PBR2 in one frame at once rather than panel block row by panel block row.

For example, the driving controller 200 may determine the face region block FB in the first panel block row PBR1 and the second panel block row PBR2 in one frame at once when sum of N and M is less than or equal to the number of the panel blocks PB included in one of the first panel block row PBR1 and the second panel block row PBR2.

For example, it is assume that the first panel block row PBR1 is a set of panel blocks PB of which numbers are 17, 18, 19, and 20, respectively, and the second panel block row PBR2 is a set of panel blocks PB of which numbers are 21, 22, 23, and 24, respectively. Since N is 1 and M is 2, the sum of N and M is less than 4 which is the number of panel blocks PB included in one panel block row PBR. So, the driving controller 200 may determine the face region block FB included in the first panel block row PBR1 and the second panel block row PBR2. That is, when the panel block rows PB include a small number of the face region candidate blocks FCB, the driving controller 200 may determine the face region blocks FB included in the plurality of panel block rows PB in one frame at once. Accordingly, the driving controller 200 may shorten time for determining the face region block FB.

Figure 15:
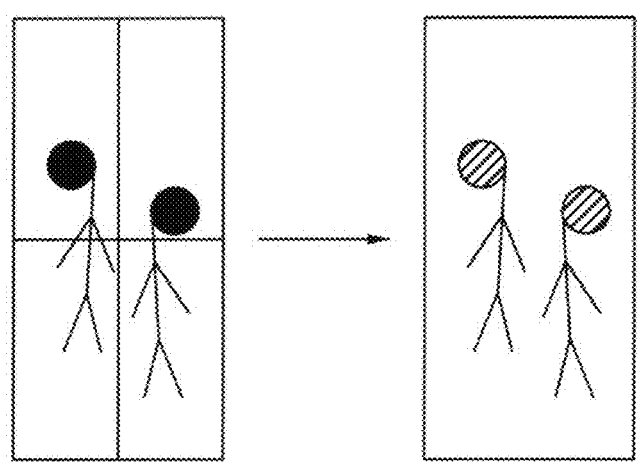
FIG. 15 is a diagram illustrating that the driving controller of the display apparatus of FIG. 1 performs image quality processing.

FIG. 15 is a diagram illustrating that the driving controller 200 of the display apparatus 1000 of FIG. 1 performs image quality processing.

Referring to FIGS. 1 and 15, the driving controller 200 may perform the image quality processing on the face region block FB. According to an embodiment, the driving controller 200 may adjust saturation of the face region block FB to perform the image quality processing.

FIG. 15 illustrates that an image is displayed on four panel blocks PB of the display panel 100. For example, the driving controller 200 may determine the above two panel blocks PB as the face region block FB. In this case, the driving controller 200 may perform the image quality processing on the above two panel blocks PB. For example, the driving controller 200 may display a brighter face image by adjusting saturation applied to the above two panel blocks PB. The image quality processing is not limited to adjusting the saturation, and may include any operation that changes the face image.

Figure 19A:
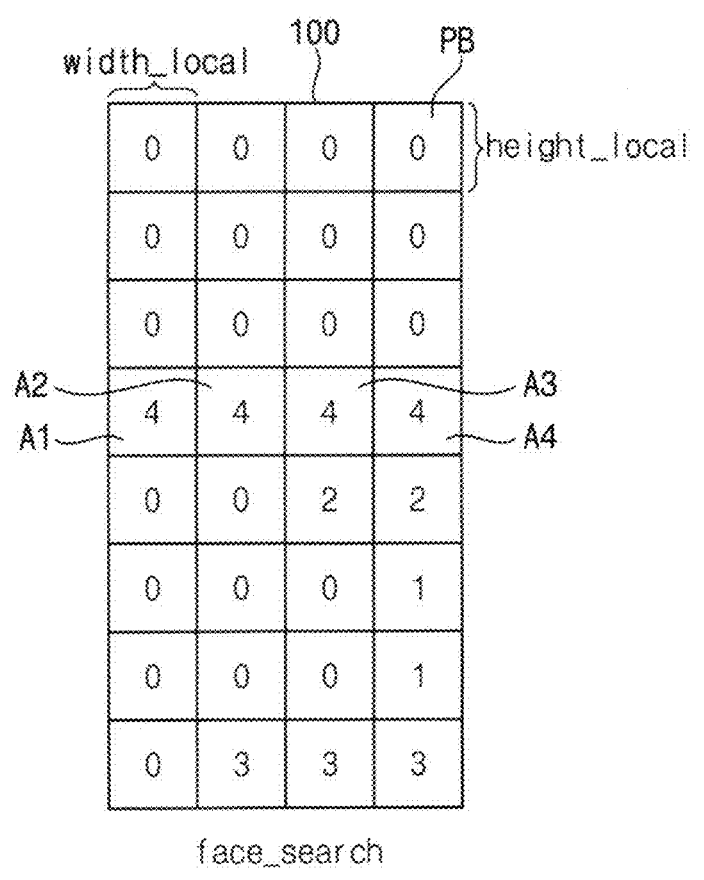

FIG. 16 is a diagram illustrating an example of equations used when a display apparatus according to an embodiment determines the skin color display pixel. FIG. 17 is a diagram illustrating an example of equations used when the display apparatus of FIG. 16 determines the face region candidate block. FIG. 18 is a diagram illustrating an example in which the display apparatus of FIG. 16 generates search data (face_search). FIGS. 19a and 19b are a diagram illustrating an example in which the display apparatus of FIG. 16 generates matching coordinates(A1_hs, A1_he, . . . , A4_hs, A4_he, A1_vs, A1_ve, . . . , A4_vs, and A4_ve). FIG. 20 is a diagram illustrating an example of equations used when the display apparatus of FIG. 16 performs the image quality processing. It is assumed that a first bit adjusting value k of the display apparatus of FIG. 16 is $2^{\wedge}8$ (i.e., $2^8$), and a second bit adjusting value z is $2^{\wedge}$ (i.e., $2^{12}$). It is assumed that the display panel of the display apparatus of FIG. 16 includes 4×8 panel blocks PB (same structure as the display panel 100 of FIG. 2). FIGS. 19a and 19b are a diagram illustrating an example of generating the matching coordinates (A1_hs, A1_he, . . . , A4_hs, A4_he, A1_vs, A1_ve, . . . , A4_vs, and A4_ve) of the panel block row PBR including four face region candidate blocks in one frame.

Referring to FIGS. 1, 4 to 6, and 16, the driving controller 200 may determine each of the skin color display pixels SP by using equations "i_cr<=((p_aa1*1_cb/k)+p_bb1)", "i_cr>((p_aa2*i_cb/k)+p_bb2)", "i_cr>((p_aa3*i_cb/k)+p_bb3)", and "i_cr<=((p_aa4*i_cb/k)+p_bb4)", where i_cr represents Cr color difference data of each of the pixels before the image quality processing is performed, i_cb represents Cb color difference data of each of the pixels before the image quality processing is performed, p_aa1 represents a first slope setting value, p_aa2 represents a second slope setting value, p_aa3 represents a third slope setting value, p_aa4 represents a fourth slope setting value, p_bb1 represents a first corner setting value, p_bb2 represents a second corner setting value, p_bb3 represents a third corner setting value, p_bb4 represents a fourth corner setting value, and k represents a first bit adjusting value. The first bit adjusting value k may be a value set to lower the number of bits of a product of the slope setting values p_aa1, p_aa2, p_aa3, and p_aa4 and the Cb color difference data i_cb.

When the Cr color difference data i_cr of a specific pixel is satisfied with equations "i_cr<=((p_aa1*i_cb/k)+p_bb1)", "i_cr>((p_aa2*i_cb/k)+p_bb2)", "i_cr>((p_aa3*1_cb/k)+p_bb3)", and "i_cr<=((p_aa4*i_cb/k)+p_bb4)", a skin color detection data (skin_detect_pixel) of the specific pixel may have a value of 1. For example, when the skin color detection data (skin_detect_pixel) of a specific pixel P is 1, the specific pixel is the skin color display pixel SP. For example, when the skin color detection data (skin_detect_pixel) of a specific pixel P is 0, the specific pixel is not the skin color display pixel SP.

For example, when the slope setting values (p_aa1, p_aa2, p_aa3, and p_aa4) are 32, the first corner setting value (p_bb1) is 300, the second corner setting value (p_bb2) is 107, and the third corner setting value (p_bb3) is 400, and the fourth corner setting value (p_bb4) is set to 107, a pixel with i_cr of 200 and i_cb of 30 is satisfied with equations $$700*32/256+300=212 \rightarrow i\_cr(200)<=212$$

$$100*32/256+120=107 \rightarrow i\_cr(200)>107$$

$$650*32/256+400=318 \rightarrow i\_cr(200)<=318$$

$$100*32/256+180=107 \rightarrow i\_cr(200)>107.$$

So, the skin color detection data (skin_detect_pixel) may be 1. Accordingly, the pixel with i_cr of 200 and i_cb of 30 may be a skin color display pixel SP.

Referring to FIGS. 1, 2, and 17, The driving controller 200 may generate skin color inclusion ratio data (color_en_sumarea) by adding all skin color detection data (skin_detect_pixel) of pixels P in one panel block PB. The display apparatus of FIG. 16 may generate 32 pieces of skin color inclusion ratio data (color_en_sumarea1, color_en_sumarea2, . . . , color_en_sumarea32). The driving controller 200 may store 32 pieces of the skin color inclusion ratio data (color_en_sumarea1, color_en_sumarea2, color_en_sumarea32) as one total skin color inclusion ratio data (color_en_sum4by8). When the respective skin color inclusion ratio data (color_en_sumarea1, color_en_sumarea2, . . . , color_en_sumarea32) is greater than or equal to the threshold inclusion ratio (colorsum_thres1_scale), the driving controller 200 may set the face region candidate block data (face_candidate) as 1.

Referring to FIG. 18, The driving controller 200 may multiply the face region candidate block data (face_candidate) by the sum of all face region candidate block data (face_candidate) of the panel blocks PB included in one panel block row PBR to generate the search data (face_search).

Referring to FIGS. 18, 19a and 19b, the driving controller 200 may generate the matching coordinates (A1_hs, A1_he, . . . , A4_hs, A4_he, A1_vs, A1_ve, . . . , A4_vs, and A4_ve) matched to the face matching data (i.e., calculating difference values between the pixel value of the face matching data FMD and the pixel value of the panel block PB). 'Hs' coordinates (A1_hs, A2_hs, A3_hs, and A4_hs) may be a horizontal start position of panel blocks PB with which the face matching data FMD is matched. 'He' coordinates (A1_hs, A2_he, A3_he, and A4_he) may be a horizontal end position of panel blocks PB with which the face matching data FMD is matched. 'Vs' coordinates (A1_vs, A2_vs, A3_vs, and A4_vs) may be a vertical start position of panel blocks PB with which the face matching data FMD is matched. 'Ve' coordinates (A1_ve, A2_ve, A3_ve, and A4_ve) may be a vertical end position of panel blocks PB with which the face matching data FMD is matched.

For example, it is assuming that a resolution of the display apparatus of FIG. 16 is 1024×2048. According to the equation described in FIGS. 19a and 19b and the search data (face_search) of each of the panel blocks PB, the x-axis matching coordinate (Search_x1) is [1 1 1 1], y-axis matching coordinates (Search_y1) is [0; 0; 0; 1; 0; 0; 0; 0]. As a result, the driving controller 200 may match the face matching data FMD with the panel blocks A1, A2, A3, and A4 in the fourth row.

Referring to FIG. 20, the driving controller 200 may perform the image quality processing by using equations "o_cb=p_tcb+weight*(i_cb-p_tcb)/z" and "o_cr=p_tcr+weight*(i_cr-p_tcr)/z", where o_cb represents Cb color difference data of each of the pixels after the image quality processing is performed, o_cr represents the Cr color difference data of each of the pixels after the image quality processing is performed, p_tcb represents target Cb color difference data, p_tcr represents target Cr color difference data, weight represents a weight, i_cb represents Cb color difference data of each of the pixels before the image quality processing is performed, i_cr represents Cr color difference data of each of the pixels before the image quality processing is performed, and z represents a second bit adjusting value. z, p_tcb, p_tcr, p_gaincc, p_aadenom1, p_aadenom2, p_aadenom3, and p_aadenom4 are values set by the user to adjust the saturation of the face region block to have a desired value. According to an embodiment, the driving controller 200 may approximate the color difference data (i_cb and i_cr) to the target color difference data (p_tcb and p_tcr) by a weight before the image quality processing is performed. For example, when the target color difference data (p_tcb and p_tcr) are set in a direction for decreasing the saturation, the saturation of the face region block may be decreased.

FIGS. 21 to 24 are flowcharts illustrating a method of driving a display apparatus according to embodiments.

Figure 21:
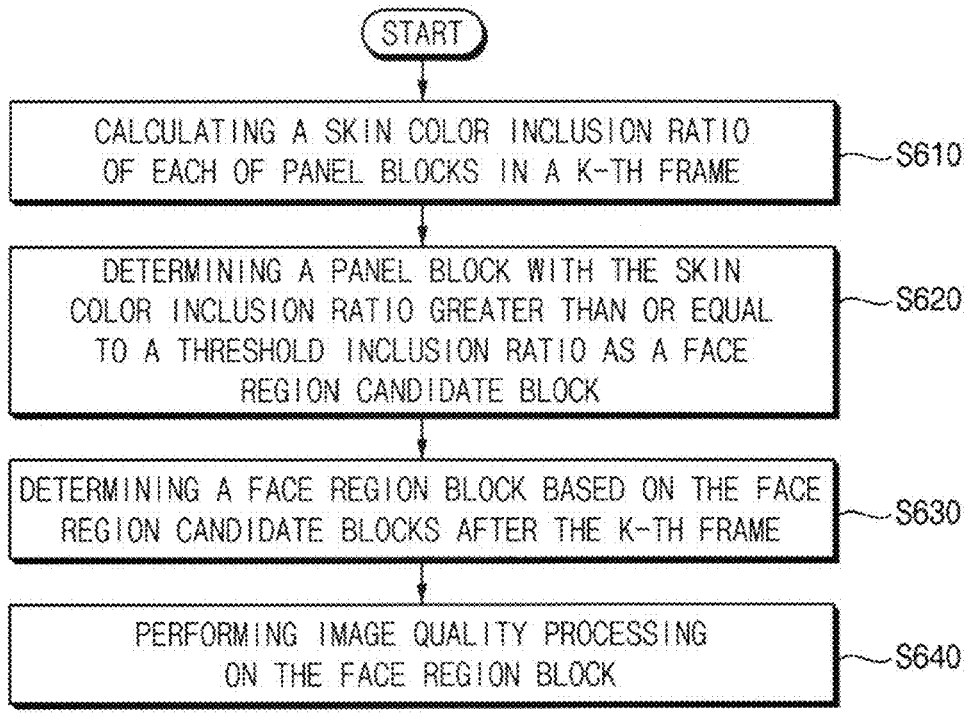
FIGS. 21 to 24 are flowcharts illustrating a method of driving a display apparatus according to embodiments.
Figure 22:
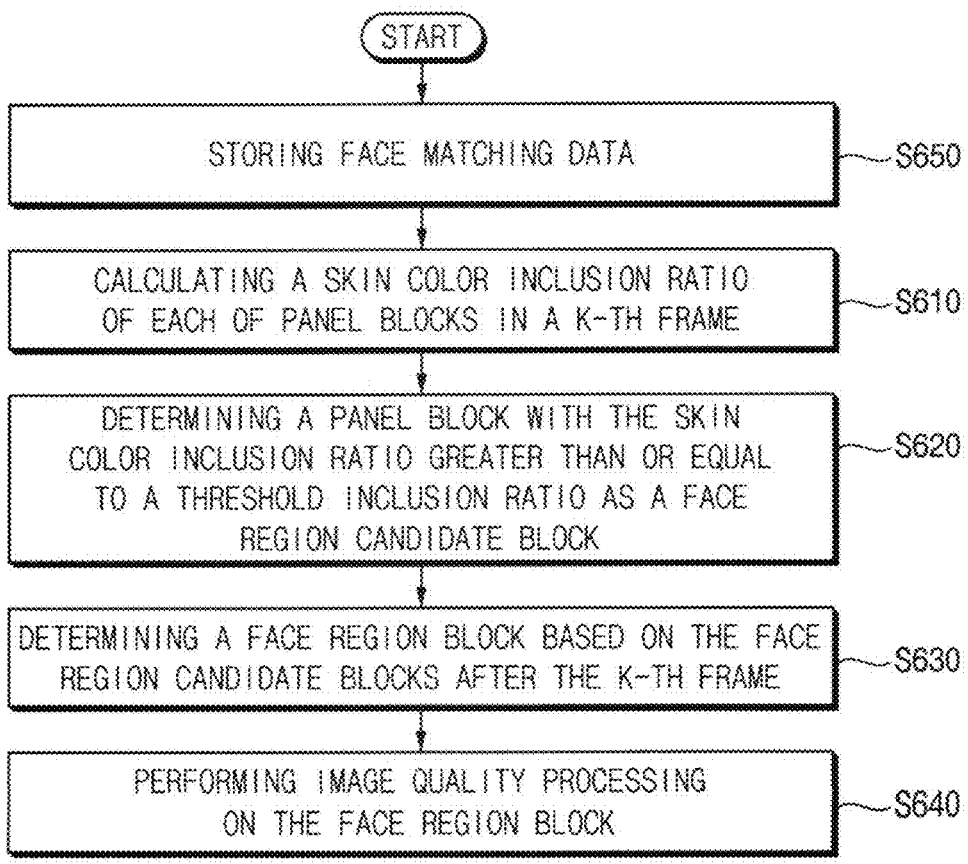
Figure 23:
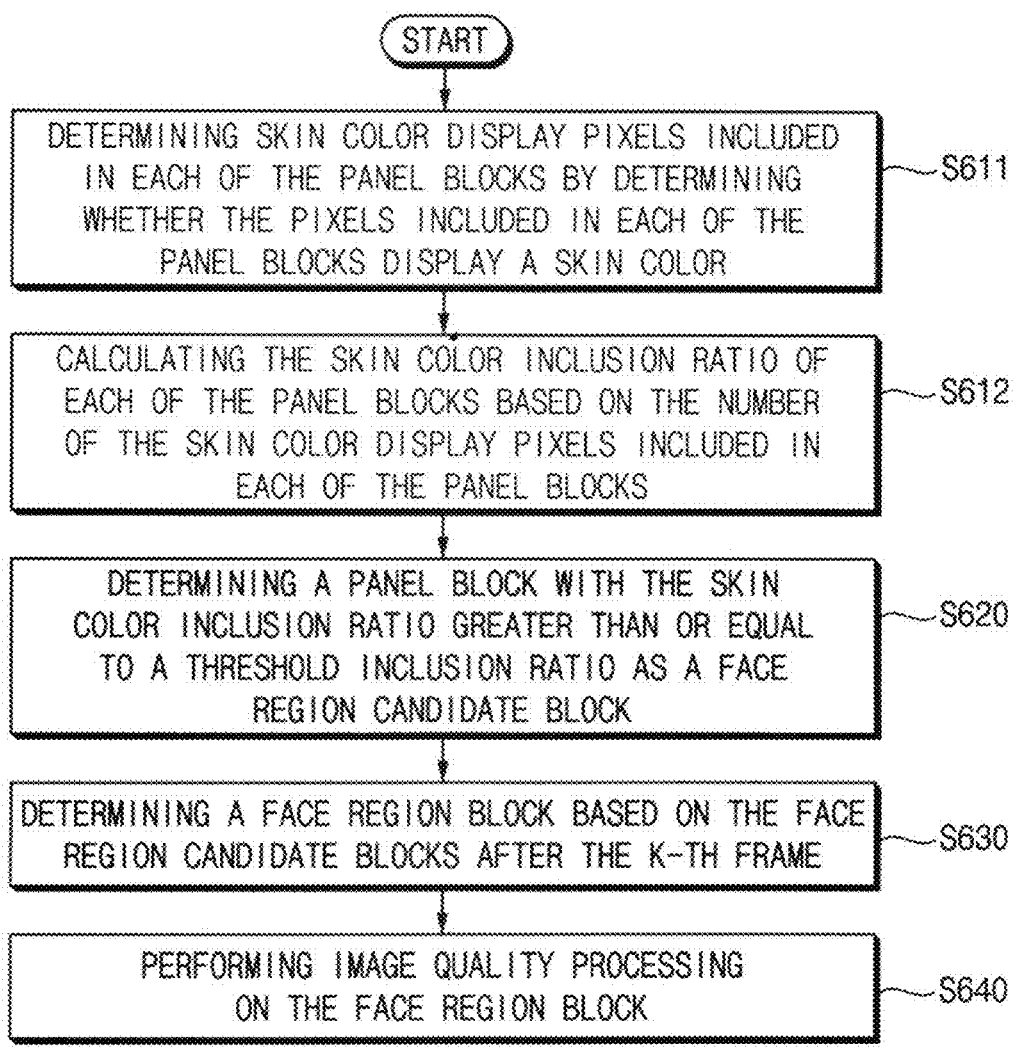
Figure 24:
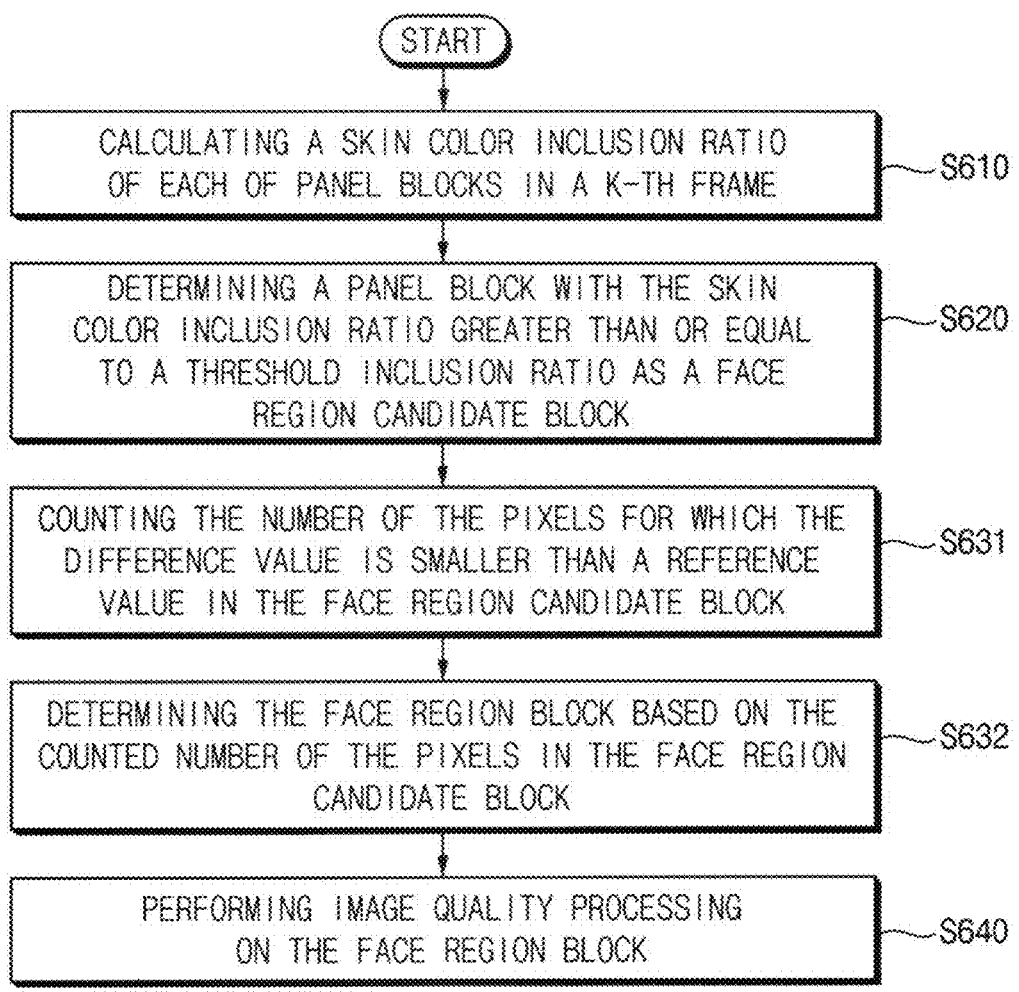

Referring to FIGS. 21 to 24, the method described in FIG. 21 may calculate the skin color inclusion ratio of each of the panel blocks PB in a K-th frame (operation S610), determine a panel block PB with the skin color inclusion ratio greater than or equal to the threshold inclusion ratio CR as the face region candidate block FCB (operation S620), determine the face region block FB based on the face region candidate block FCB after the K-th frame (operation S630), and perform the image quality processing on the face region block FB (operation S640). According to an embodiment, the method may store the face matching data FMD. According to an embodiment, the face region block FB may be determined based on the difference value between the pixel value of the face matching data FMD and the pixel value of the input image data IMG for the face region candidate block FCB.

Specifically, the method described in FIG. 21 may calculate the skin color inclusion ratio of each of the panel blocks PB in the K-th frame (operation S610). The method described in FIG. 21 may determine the skin color display pixels SP included in each of the panel blocks PB by determining whether the pixels P included in each of the panel blocks PB display the skin color (operation S611), and calculate the skin color inclusion ratio of each of the panel blocks PB based on the number of the skin color display pixels SP included in each of the panel blocks PB (operation S612).

Specifically, the method described in FIG. 21 may determine the face region block FB based on the face region candidate blocks FCB after the K-th frame (operation S630). The method described in FIG. 21 may count the number NP of the pixels P for which the difference value DV is smaller than the reference value SV in the face region candidate block FCB (operation S631), and determine the face region block FB based on the counted number NP of the pixels P in the face region candidate block FCB (operation S632). According to an embodiment, when the number of the face region candidate blocks FCB included in the first panel block row PBR1 of the display panel 100 is less than the number of the face region candidate blocks FCB included in the second panel block row PBR2 of the display panel 100, the face region block FB in the first panel block row PBR1 may be determined after determining the face region block FB in the second panel block row PBR2. For example, when the first panel block row PBR1 includes the N face region candidate blocks FCB, and the second panel block row PBR2 includes the M face region candidate blocks FCB, the face region block FB in the first panel block row PBR1 may be determined in a K+Ath frame (where A is a positive integer greater than 1), and the face region block FB in the second panel block row PBR2 may be determined in a K+Bth frame (where B is a positive integer less than A). According to an embodiment, when a sum of the number of the face region candidate blocks FCB included in the first panel block row PBR1 and the number of the face region candidate blocks FCB included in the second panel block row PBR2 of the display panel 100 is less than or equal to the number of the panel blocks PB in one panel block row PBR of the display panel 100, the face region block FB in the first and second panel block rows PBR1 and PBR2 may be determined in one frame at once. For example, when the first panel block row PBR includes the N face region candidate block FCB, the second panel block row PBR2 includes the M face region candidate block, and sum of N and M is less than or equal to the number of the panel blocks PB included in one of the first panel block row PBR1 and the second panel block row PBR2, the first panel block row PBR1 and the second panel block row PBR2 may be determined in one frame at once.

Specifically, the method described in FIG. 21 may perform the image quality processing on the face region block FB (operation S640). The image quality processing may be performed by adjusting saturation of the face region block FB.

The display apparatus according to embodiments may independently recognize a face without the help of an external device (e.g., the host processor). Also, the display apparatus according to embodiments may perform the face recognition regardless of a direction of face in image by using the face matching data FMD including rotation-specific information.

The inventions may be applied any electronic apparatus including the display apparatus. For example, the inventions may be applied to a television ("TV"), a digital TV, a 3D TV, a mobile phone, a smart phone, a tablet computer, a virtual reality ("VR") apparatus, a wearable electronic apparatus, a personal computer ("PC"), a home appliance, a laptop computer, a personal digital assistant ("PDA"), a portable multimedia player ("PMP"), a digital camera, a music player, a portable game console, a navigation apparatus, etc.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display apparatus comprising: a display panel including a plurality of pixels; a data driver which applies data voltages to the pixels; a gate driver which applies gate signals to the pixels; and a driving controller which controls the data driver and the gate driver, wherein the driving controller is configured to divide the display panel into a plurality of panel blocks, to calculate a skin color inclusion ratio of each panel block of the plurality of panel blocks based on input image data, to determine at least one face region candidate block among the plurality of panel blocks based on the skin color inclusion ratio, to determine a face region block of the at least one face region candidate block based on the at least one face region candidate block and face matching data, and to perform image quality processing on the face region block; wherein the driving controller is configured to determine the face region block based on a difference value between a pixel value of the face matching data and a pixel value of the input image data for the at least one face region candidate block; wherein the driving controller is configured to count a number of pixels for which the difference value is smaller than a reference value in the face region candidate block, and to determine the face region block based on the counted number of the pixels in each of the at least one face region candidate block; and wherein, when a first number of face region candidate blocks of a first at least one face region candidate block included in a first panel block row of the display panel is less than a second number of face region candidate blocks of a second at least one face region candidate block included in a second panel block row of the display panel, the driving controller is configured to determine the face region block in the first panel block row after determining the face region block in the second panel block row.

2. The display apparatus of claim 1, wherein the driving controller is configured to determine skin color display pixels included in each panel block of the plurality of panel blocks by determining whether pixels included in each panel block of the plurality of panel blocks display a skin color, and to calculate the skin color inclusion ratio of each panel block of the plurality of panel blocks based on a number of the skin color display pixels included in each panel block of the plurality of panel blocks.

3. The display apparatus of claim 2, wherein the driving controller is configured to determine each of the skin color display pixels by using equations "$i\_cr <= ((p\_aa1*i\_cb/k) + p\_bb1)$", "$i\_cr > ((p\_aa2*i\_cb/k) + p\_bb2)$", "$i\_cr > ((p\_aa3*i\_cb/k) + p\_bb3)$", and "$i\_cr <= ((p\_aa4*i\_cb/k) + p\_bb4)$", where i_cr represents Cr color difference data of each of the plurality of pixels before the image quality processing is performed, i_cb represents Cb color difference data of each of the pixels in the plurality of pixels before the image quality processing is performed, p_aa1 represents a first slope setting value, p_aa2 represents a second slope setting value, p_aa3 represents a third slope setting value, p_aa4 represents a fourth slope setting value, p_bb1 represents a first corner setting value, p_bb2 represents a second corner setting value, p_bb3 represents a third corner setting value, p_bb4 represents a fourth corner setting value, and k represents a first bit adjusting value.

4. The display apparatus of claim 1, wherein the driving controller is configured to determine a panel block of the plurality of panel blocks with the skin color inclusion ratio greater than or equal to a threshold inclusion ratio as one of the at least one face region candidate block.

5. The display apparatus of claim 1, wherein the face matching data is generated based on different face images, and the different face images are generated based on different angles of a face or different illumination on the face.

6. The display apparatus of claim 1, wherein the driving controller is configured to generate a histogram using the difference values in each of the at least one face region candidate block, and to determine the face region block based on the histogram.

7. The display apparatus of claim 1, wherein the driving controller is configured to determine a face region candidate block of the at least one face region candidate block included in one panel block row in each frame as the face region block based on the face matching data.

8. A display apparatus comprising:
a display panel including a plurality of pixels;
a data driver which applies data voltages to the pixels;
a gate driver which applies gate signals to the pixels; and
a driving controller which controls the data driver and the gate driver, wherein the driving controller is configured to divide the display panel into a plurality of panel blocks, to calculate a skin color inclusion ratio of each panel block of the plurality of panel blocks based on input image data, to determine at least one face region candidate block among the plurality of panel blocks based on the skin color inclusion ratio, to determine a face region block of the at least one face region candidate block based on the at least one face region candidate block and face matching data, and to perform image quality processing on the face region block, wherein the driving controller is configured to determine the face region block based on a difference value between a pixel value of the face matching data and a pixel value of the input image data for the at least one face region candidate block, wherein the driving controller is configured to count a number of pixels for which the difference value is smaller than a reference value in the face region candidate block, and to determine the face region block based on the counted number of the pixels in each of the at least one face region candidate block, and wherein, when a sum of a first number of face region candidate blocks of a first at least one face region candidate block included in a first panel block row and a second number of face region candidate blocks of a second at least one face region candidate block included in a second panel block row of the display panel is less than or equal to a number of panel blocks in each panel block row of the display panel, the driving controller is configured to determine the face region block in the first panel block row and the face region block in the second panel block row in one frame at once.

9. The display apparatus of claim 1, wherein the driving controller is configured to adjust saturation of the face region block to perform the image quality processing.

10. The display apparatus of claim 9, wherein the driving controller is configured to perform the image quality processing by using equations "$o\_cb = p\_tcb + weight*(i\_cb - p\_tcb)/z$" and "$o\_cr = p\_tcr + weight*(i\_cr - p\_tcr)/z$", where o_cb represents Cb color difference data of each of the plurality of pixels after the image quality processing is performed, o_cr represents the Cr color difference data of each of the plurality of pixels after the image quality processing is performed, p_tcb represents target Cb color difference data, p_tcr represents target Cr color difference data, weight represents a weight, i_cb represents Cb color difference data of each of the plurality of pixels before the image quality processing is performed, i_cr represents Cr color difference data of each of the plurality of pixels before the image quality processing is performed, and z represents a second bit adjusting value.

* * * * *